US009019442B2

(12) United States Patent
Chen et al.

(10) Patent No.: US 9,019,442 B2
(45) Date of Patent: Apr. 28, 2015

(54) STEREOSCOPIC IMAGE DISPLAY DEVICE AND MANUFACTURING METHOD THEREOF

(75) Inventors: Yi-Ling Chen, Hsin-Chu (TW); Tsung-Fu Cheng, Hsin-Chu (TW); Yue-Feng Lin, Hsin-Chu (TW); Tsung-Hsien Chuang, Hsin-Chu (TW); Hsiang Cheng, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 329 days.

(21) Appl. No.: 13/464,003

(22) Filed: May 4, 2012

(65) Prior Publication Data
US 2012/0281158 A1 Nov. 8, 2012

(30) Foreign Application Priority Data

May 4, 2011 (TW) .............................. 100115695 A

(51) Int. Cl.
| | | |
|---|---|---|
| *G02F 1/1335* | (2006.01) | |
| *G02F 1/1333* | (2006.01) | |
| *G02B 27/22* | (2006.01) | |
| *F21V 7/04* | (2006.01) | |

(52) U.S. Cl.
CPC ...... *G02F 1/133308* (2013.01); *G02F 2201/46* (2013.01)

(58) Field of Classification Search
CPC ......... G02F 2001/133328; G02F 2001/133317
USPC ............ 359/477; 349/15, 58, 60, 65; 362/633
See application file for complete search history.

(56) References Cited

U.S. PATENT DOCUMENTS

| | | | |
|---|---|---|---|
| 6,667,780 B2 * | 12/2003 | Cho ................................ 349/58 |
| 7,868,968 B2 * | 1/2011 | Sudo .............................. 349/58 |
| 2004/0008512 A1 | 1/2004 | Kim | |
| 2008/0007538 A1 | 1/2008 | Kotera et al. | |
| 2008/0143918 A1 | 6/2008 | Kim | |
| 2009/0310216 A1 * | 12/2009 | Roh et al. ...................... 359/465 |
| 2010/0091227 A1 | 4/2010 | Chen et al. | |
| 2010/0283924 A1 | 11/2010 | Lee et al. | |
| 2011/0292314 A1 * | 12/2011 | Chen et al. ..................... 349/58 |
| 2012/0086673 A1 | 4/2012 | Chien et al. | |

FOREIGN PATENT DOCUMENTS

| | | |
|---|---|---|
| CN | 201489235 U | 5/2010 |
| CN | 101737735 | 6/2010 |

(Continued)

OTHER PUBLICATIONS

English translation of CN 201489235 U (published May 25, 2010).

*Primary Examiner* — Paisley L Arendt
(74) *Attorney, Agent, or Firm* — McClure, Qualey & Rodack, LLP

(57) ABSTRACT

A stereoscopic image display device includes a back bezel, a backlight module disposed on the back bezel, a frame set surrounding and positioning the backlight module, and a liquid crystal panel receiving light emitted from the backlight module; wherein the liquid crystal panel is surrounded and supported by the frame set and has a transparent plate attached to the display surface of the liquid crystal panel. There is a stereoscopic image producing layer formed at a side of the transparent plate facing the display surface of the liquid crystal panel. The transparent plate, the frame set, and the back bezel constitute the outward appearance of the stereoscopic image display device.

24 Claims, 11 Drawing Sheets

(56) References Cited

FOREIGN PATENT DOCUMENTS

| CN | 101739907 | 6/2010 |
|---|---|---|
| JP | 2007298670 | 11/2007 |
| TW | I279619 B | 4/2007 |
| TW | 200848855 | 12/2008 |
| TW | M368074 | 11/2009 |
| TW | 201015115 A | 4/2010 |

* cited by examiner

STEREOSCOPIC IMAGE DISPLAY DEVICE AND MANUFACTURING METHOD THEREOF

BACKGROUND OF THE INVENTION

1. Field of the Invention

The present invention generally relates to a display device. Particularly, the present invention relates to a stereoscopic image display device and a manufacturing method thereof.

2. Description of the Prior Art

Following the trend from being in monochrome, being in color, scaling up in dimension, being in high resolution, and then to slimming down in panel flatness, technological advances in displays have all been geared towards pursuing a more realistic and natural visual experience for users. In this respect, development of stereoscopic display technologies provides a further step for users' visual senses. In other words, besides images and color, stereoscopic technologies provide a sense of three-dimensional spacing. Stereoscopic technologies include three-dimensional eye glass technology that must be worn by users to create three-dimensional effects, as well as stereoscopic technology where the naked eye may see three-dimensional effects generated by the stereoscopic display device itself without the need of three-dimensional glasses. three-dimensional eye glass displays utilize technologies such as spatial multiplexing, time-multiplexing, multi-layered depth type screens, or volumetric types of technologies to cause visual disparities in users in order to create three-dimensional visual effects.

Accordingly, various different stereoscopic display devices following the different technology philosophies have been manufactured. On the other hand, besides upgrading the visual effects, the hardware of display devices have also advanced as the technology in the display device industry has improved along with trends in consumer needs for slimmer and lighter display devices. As such, under the dual demands of seeking better visual effects as well as seeking better exterior aesthetics of the display devices, if a stereoscopic display technology and improvements to the hardware equipment can be successfully researched and developed, then a display device suited for the needs of modern times may be manufactured.

As shown in FIG. 1, the conventional stereoscopic display device has a phase retardation film 7 disposed on a display surface of the liquid crystal panel 3. A bracket 4 and/or a front frame 5 is further disposed on the liquid crystal panel 3 having the phase retardation film 7. A transparent plate 6 is then typically disposed on the outside or on the front frame 5 to protect the structure of the liquid crystal panel 3 and the phase retardation film 7. In this instance, the medium between the protective plate 6 and the liquid crystal panel 3 (including the phase retardation film 7) may cause errors in the image display, and consequently in respect to the users affect the visual effects. Furthermore, the addition of the bracket 4 or the front frame 5 increases the dimensions of the display device, which increases the assembling or dismantling steps during the manufacturing of the display device.

SUMMARY OF THE INVENTION

It is an object of the present invention to provide a stereoscopic display device having a simplified mechanism design.

It is another object of the present invention to provide a stereoscopic display device having a mechanism design for assembling, dismantling, or reworking.

It is another object of the present invention to provide a manufacturing method of the stereoscopic display device having reduced manufacturing steps by means of an integrated processing.

The stereoscopic image display device of the present invention has a bottom portion formed with a back bezel, a side portion formed with a frame set, a liquid crystal panel opposite to the bottom portion, and a transparent plate attaching to a display surface of the liquid crystal panel with a side thereof having a stereoscopic image producing layer formed thereon, wherein the transparent plate together with the liquid crystal panel constitute a stereoscopic image displaying module as a top portion of the stereoscopic image display device. The transparent plate is a transparent protective plate for protection. The stereoscopic image display device further includes a backlight module disposed on the back bezel; the frame set surrounds an outer rim of the backlight module and positions the backlight module from a side opposite to the back bezel. The frame set also surrounds and supports the liquid crystal panel.

The frame set is detachably connected to the back bezel and includes a frame body. The frame body includes a sidewall and a supporting plate, wherein the sidewall is disposed on the outer rim of the backlight module, the supporting plate extends from an inner surface of the sidewall and inside the frame body. The frame set further includes a assembling unit disposed between the back bezel and the liquid crystal panel, detachably connected to the frame body, and together with the frame body support the liquid crystal panel; wherein the assembling unit is connected to the liquid crystal panel at one side thereof and detachably connected to the back bezel at the other side thereof by means of a fixing portion on the other side. A through hole is formed on the supporting plate of the frame body for the fixing portion of the assembling unit passing through to enable the assembling unit to be disposed on the frame body. On the other hand, an accommodation trough is formed at a side of the assembling unit facing the back bezel and backlight module for a positioning unit being accommodated therein to position a light guide plate.

The assembling unit is also attached to the liquid crystal panel and is detachably connected to the frame body so that the liquid crystal panel is supported by the frame body. The assembling unit is also detachably connected to the back bezel so that the liquid crystal panel is fastened to the back bezel by means of the assembling unit, wherein the assembling unit and the frame body can be respectively detachably connected to the back bezel. The assembling unit is further detachably connected to the back bezel by means of a block. The block is formed at a side of a light source holder facing the sidewall, wherein the light source holder is adjacent to the sidewall and extends along the sidewall; in addition, the block has a fastening hole for accommodating the fixing portion, The fastening hole includes an a screwing portion, wherein the fixing hole on the back bezel is corresponding to the screwing hole. Furthermore, the stereoscopic image display device includes a fastening element, which together with the fixing hole and the fixing portion fasten the assembling unit to the back bezel.

The manufacturing method of the stereoscopic image display device includes: forming the stereoscopic image producing layer on the transparent plate; attaching the liquid crystal panel to the side of the transparent plate having the stereoscopic image producing layer to form the stereoscopic image displaying module; disposing the stereoscopic image displaying module on the frame set, which further includes supporting the stereoscopic image displaying module by the frame body and/or connecting the stereoscopic image displaying module to the assembling unit; finally assembling the back bezel, the backlight module, and the frame set having the stereoscopic image displaying module.

DETAILED DESCRIPTION OF THE PREFERRED EMBODIMENT

Figure 1:
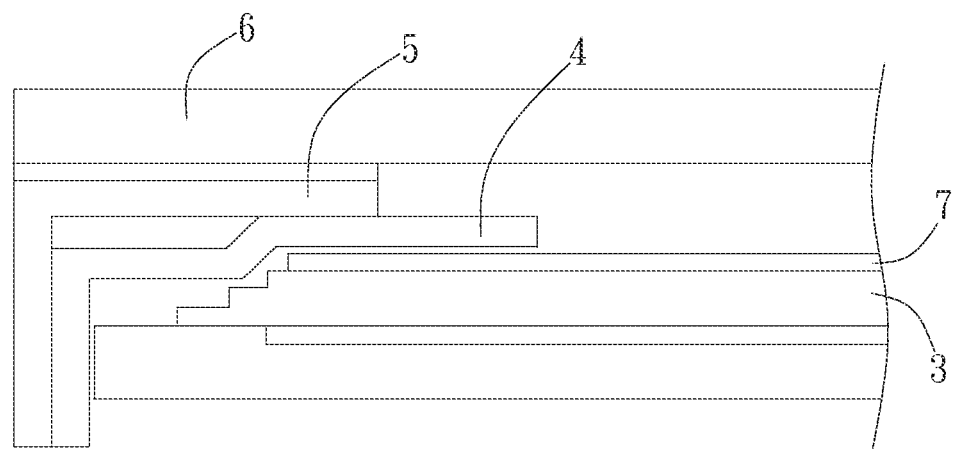
FIG. 1 is a schematic view of the conventional image display device.
Figure 2A:
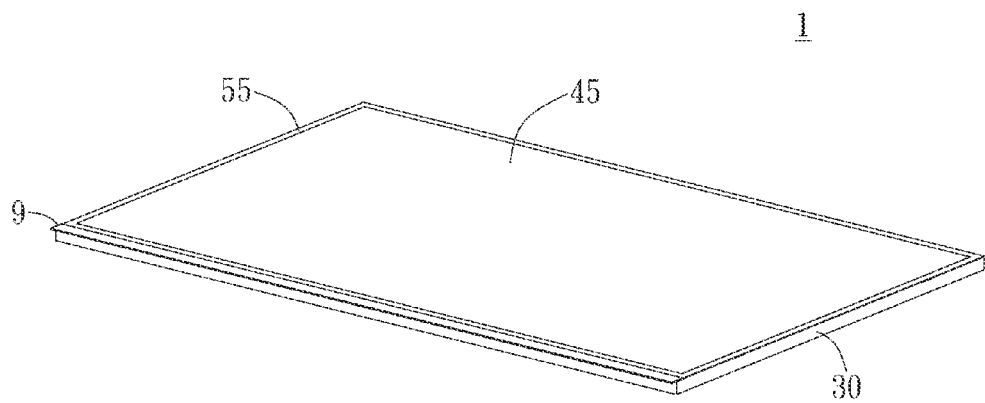
FIG. 2A is a perspective view of the embodiment of the stereoscopic image display device of the present invention.
Figure 2B:
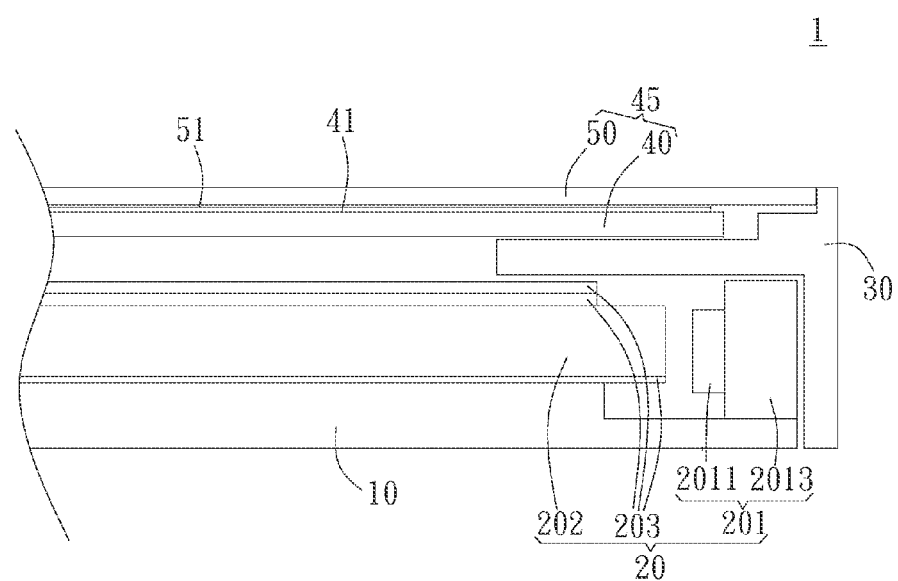
FIG. 2B is a schematic view of the embodiment of the stereoscopic image display device of the present invention.
Figure 2C:
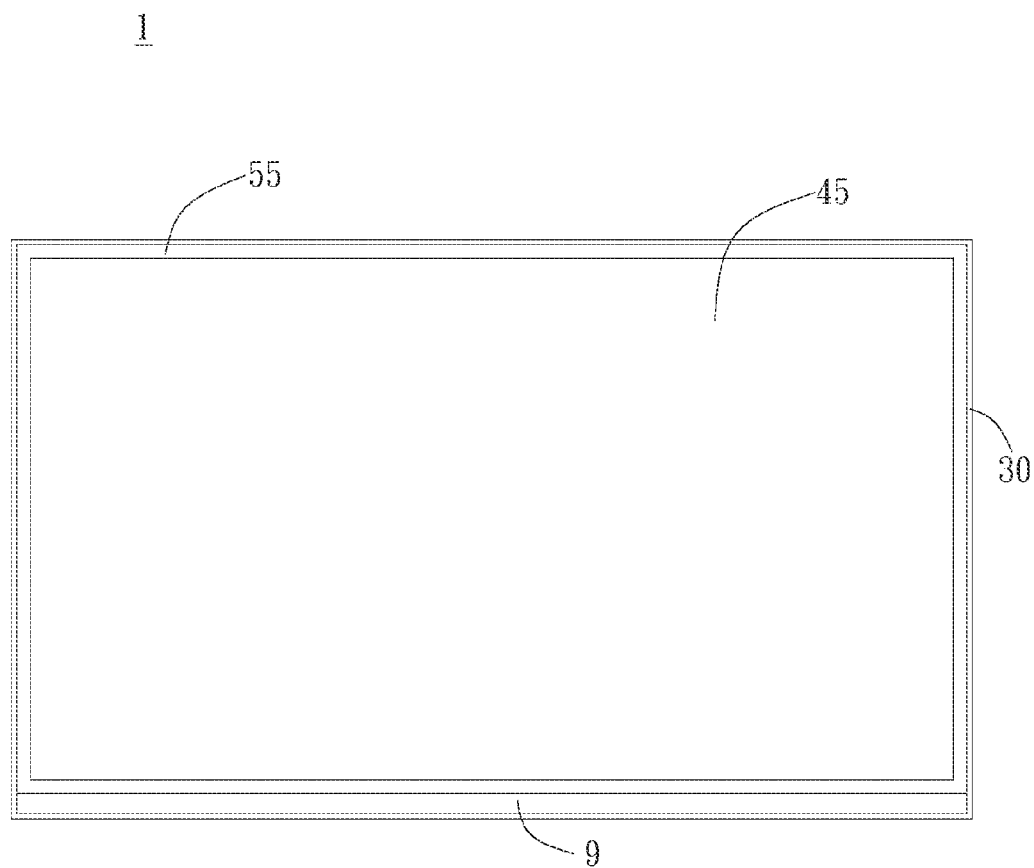
FIG. 2C is a top view of the embodiment of the stereoscopic image display device of the present invention.

As FIGS. 2A-2B show, the stereoscopic image display device 1 of the present invention has a bottom portion formed with a back bezel 10, a side portion formed with a frame set 30, and a liquid crystal panel 40 opposite to the bottom portion. In addition, a transparent plate 50, which is attached to a display surface 41 of the liquid crystal panel 40, together with the liquid crystal panel 40 constitute a stereoscopic image displaying module 45 as a top portion of the stereoscopic image display device 1, wherein the transparent plate 50 is preferably a transparent protective plate for protection. As a result, as FIG. 2C shows, wherein the top view is quite equal to what the viewer sees, the stereoscopic image displaying module 45 shown is as greatest as possible while the frame set 30 surrounding the stereoscopic image displaying module 45 is limited to as smallest as possible. Accordingly, a display surface of the stereoscopic image display device 1 therefore achieves the maximum of area due to the stereoscopic image displaying module 45, which is as greatest as possible. A decoration plate 9 is disposed along a side of the stereoscopic image display device 1 in way of not interfering with the display surface in order to cover and protect electrical circuits at the side.

Figure 2D:
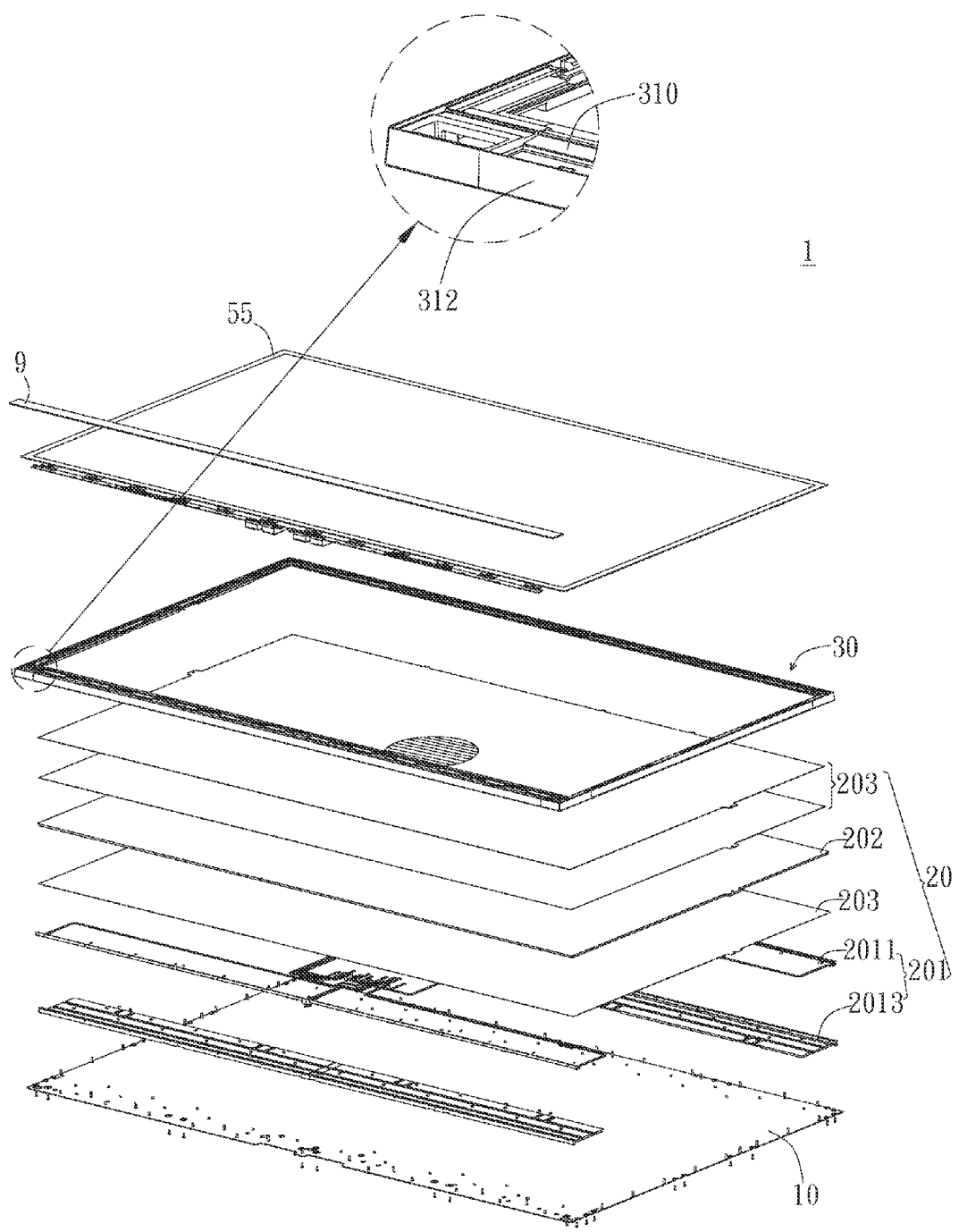
FIG. 2D is an exploded view of the embodiment of the stereoscopic image display device of the present invention.

FIG. 2D shows an exploded view of the stereoscopic image display device 1. As FIG. 2D shows, the back bezel 10 of the stereoscopic image display device 1 of the present invention provides supporting and protecting function. A backlight module 20 is disposed on the back bezel 10, wherein the backlight module 20 can be edge-lighting or bottom-lighting type. Taking the edge-lighting type backlight module as an example, the backlight module 20 includes a light source module 201, a light guide plate 202, and at least one optical film 203 disposed on and parallel to the back bezel 10. In the present embodiment, the light source of the light source module 201 may be implemented as Cold Cathode Fluorescent Lamp (CCFL), Hot Cathode Fluorescent Lamp (HCFL), Light-Emitting Diode (LED), or Electro Luminescent. In the preferred embodiment, the light source module 201 includes a light source holder 2013, the LED light source 2011 disposed on the light source holder 2013, and a heat-dissipating device (not shown) on the light source holder 2013. The light source module 201 is preferably disposed at the opposite two sides of the light guide plate 202 and extends along the sides of the light guide plate 202. The optical film 203 includes diffusion plate, brightness enhancement film, prism sheet, and other such materials used to elevate light use efficiency and light efficiency. Alternatively, the optical film 203 may also be a multi-function optical film.

Figure 3:
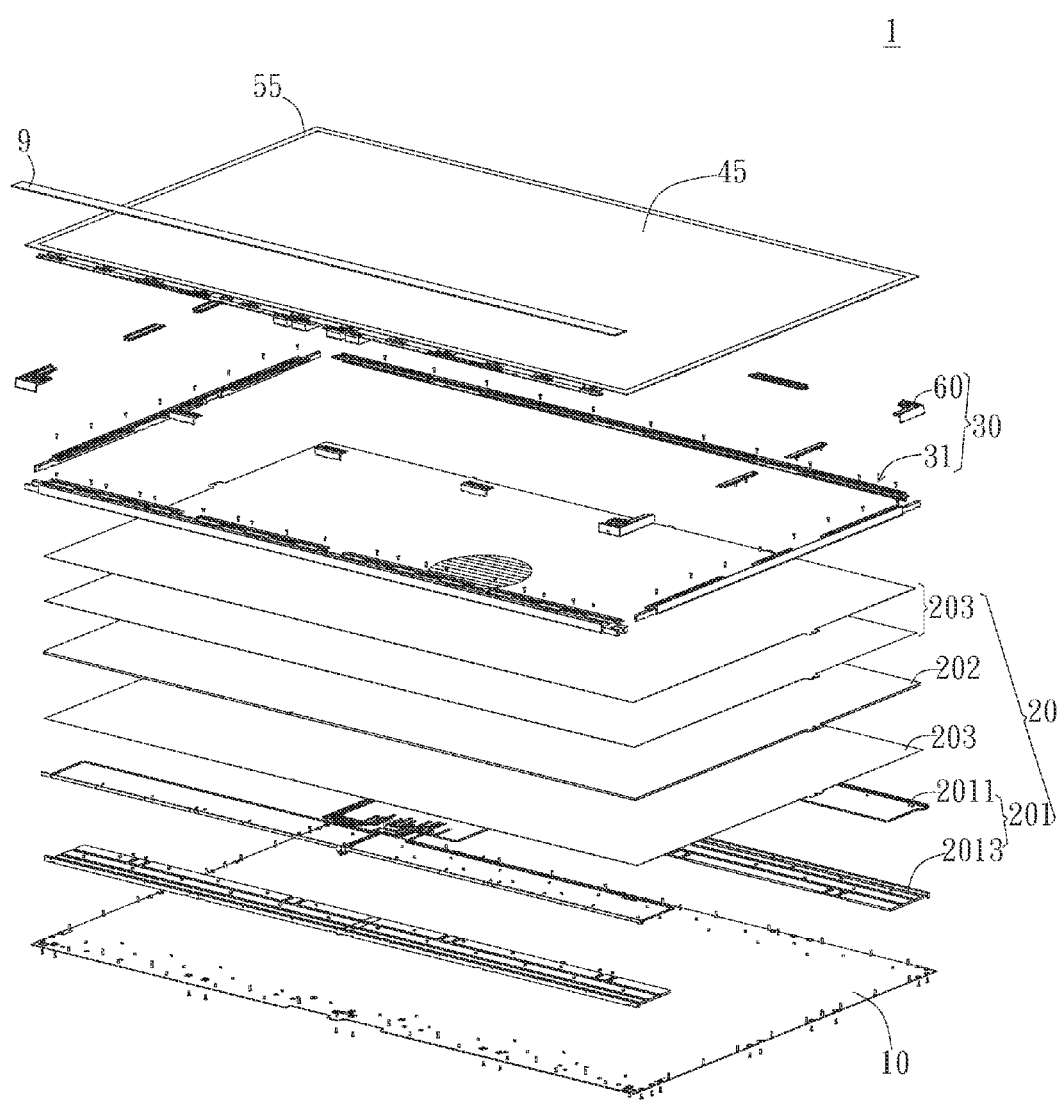
FIG. 3 is an exploded view of another embodiment of the present invention.

On the other hand, the frame set 30 formed as the side portion of the stereoscopic image display device 1 mentioned above surrounds an outer rim of the backlight module 20, wherein the backlight module 20 is disposed between the frame set 30 and the back bezel 10, the frame set 30 positions the backlight module 20 from a side opposite to the back bezel 10. In other words, the backlight module 20 and the back bezel 10 are on the same side of the frame set 30, wherein the frame set 30 is assembled on the back bezel. (i.e. the frame set 30 and the back bezel 10 are assembled in way of detachably being connected to each other). As FIG. 3 shows, the frame set 30 includes a frame body 31 having a sidewall 312 and a supporting plate 210, wherein the sidewall 312 surrounds the backlight module 20, the supporting plate 310 extends from an inner surface of the sidewall 312 and inside the frame body 31. In addition, the liquid crystal panel 40 mentioned above is disposed at a side of the backlight module 20 facing away from the back bezel 10 to receive light emitted from the backlight module 20, wherein the liquid crystal panel 40 is surrounded and supported by the frame set 30. In other words, the frame set 30 surrounds and positions the backlight module 20 from a side opposite to the back bezel 10 while surrounding and supporting the liquid crystal panel 40 at a side that is the same with the back bezel 10 (please refer to FIG. 2B). Specifically, the supporting plate 310 of the frame body 31 extends inside the frame body 31 and toward the liquid crystal panel 40 to provide functions of support. In addition, there is preferably a cushion portion made of materials such as rubber or plastic that is disposed between the liquid crystal panel 40 and the supporting plate 310, wherein the cushion portion therebetween is connected to the liquid crystal panel 40 and/or the supporting plate 310 by way of adhering, attaching, etc. The frame body 31 is connected to the back bezel 10 by way of locking, fastening, adhering, welding, etc . . .

As FIGS. 2B and 2D show, the liquid crystal panel 40 has a display surface 41 facing away from the backlight module 20. The transparent plate 50, which has greater the measure of area than that of the liquid crystal panel 40 and is preferably made of the material such as glass, is attached to the display surface 41 of the liquid crystal panel 40. Together with the liquid crystal panel 40, the transparent plate 50 constitutive the stereoscopic image displaying module 45. In addition, the transparent plate 50 itself has a stereoscopic image producing layer 51, such as a phase retardation layer that is formed thereon or therein to enable the stereoscopic image display device 1 to provide the user the required visual effects. Except for stereoscopic display technologies such as Parallax Barrier or Lenticular Lens Array, in the embodiment of the present invention the transparent plate 50 may be implemented as a Glass Pattern Retarder (GPR), which together with the liquid crystal panel 40, the backlight module 20 and the other components contribute to stereoscopic image display. Specifically, the side of the GPR contributing to the phase retardation effect is the side facing the liquid crystal panel 40 and being attached to the display surface 41 of the liquid crystal panel 40, wherein the liquid crystal panel 40 and the GPR attached thereto together form the stereoscopic image displaying module 45. In other words, the surface of the transparent plate 50 having the stereoscopic image producing layer 51 thereon faces the interior of the device 1. The stereoscopic image producing layer 51 is therefore protected by the transparent plate 50 from being exposed to outside environment. In addition, since there is no air medium between the liquid crystal panel 41 and the stereoscopic image producing layer 51, the device 1 of the present invention has better stereoscopic image displaying effect than does the conventional display device. Moreover, since the stereoscopic image displaying module 45 acts as the top portion of the device 1 and there is not a front frame covering thereon, it is preferable to implement a black matrix processing to form a light-shielding layer 55 such as a black matrix along the rim (the four sides of the transparent plate 50 before forming the stereoscopic image producing layer 51). Alternatively, it is able to form a light-shielding layer 55 through methods such as printing along the same four sides of the transparent plate 50 at a side that is the same or that is opposite to (i.e., the side facing the viewer) the side at which the stereoscopic image producing layer 51 is formed to reduce or present light reflection. Since the measure of area of the transparent 50 is greater than that of the liquid crystal panel 40, the light-shielding layer 55 is preferably along the rim (i.e., the four sides of the transparent plate 50) to surround an outer edge of the liquid crystal panel 40, and therefore surrounds a display area of the stereoscopic image displaying module 45. In addition, when the stereoscopic image displaying module 45 constituted by the transparent plate 50 having the light-shielding layer 55 and the liquid crystal panel 40 together with the frame set 30, the backlight module 20, and the back bezel 10 constitute the stereoscopic image display device 1 shown in FIGS. 2A and 2C, the light-shielding layer 55 is preferably projected on the supporting plate 310 of the frame set 30, wherein the projection area preferably does not exceed the supporting plate 310.

Figure 4A:
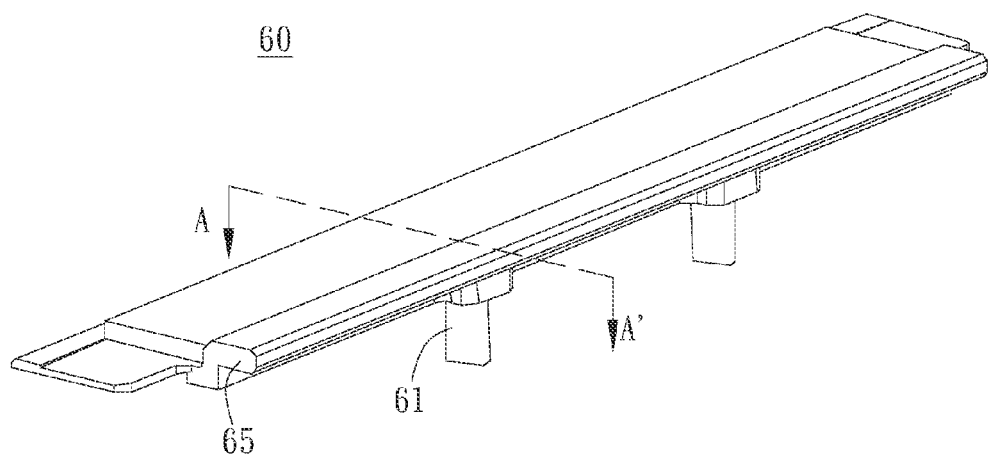
FIG. 4A is a perspective view of the assembling unit of another embodiment of the present invention.
Figure 4B:
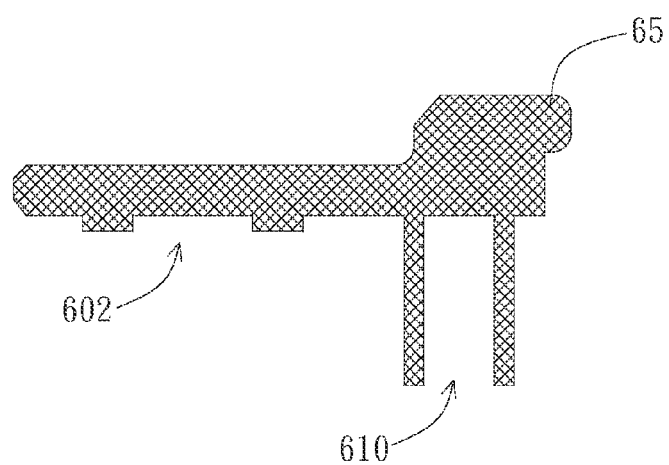
FIG. 4B is a cross-sectional view of FIG. 4A along the cross-sectional line A-A'.

In another embodiment shown in FIG. 3, except the frame body 31, the frame set 30 further includes a plurality of assembling unit 60 together with the frame body 31 to support the liquid crystal panel 40. The assembling unit 60 is disposed between the back bezel 10 and the liquid crystal panel 40 and is detachably connected to the frame body 31. In addition, the assembling unit 60 is connected to the liquid crystal panel 40 at one side thereof and is detachably connected to the back bezel 10 at the other side thereof (described later). As FIG. 4A shows, the assembling unit 60 includes a fixing portion 61 extending toward the back bezel 10 to connect the assembling unit 60 and the back bezel 10. Particularly, as FIG. 4B shows, the fixing portion 61 preferably has a screwing hole 610 corresponding to a fixing hole 100 (described later) on the back bezel 10. In addition, an accommodation trough 602 is further formed at a side of the assembling unit 60 facing the backlight module 20 (i.e. at the same side with the fixing portion 61) for a positioning unit being disposed therein. The positioning unit may be a cushion or a pad to contact with the backlight module 20 to produce frictional resistance, wherein disposing the cushion or the pad in the accommodation trough 602 can position the backlight module 20, especially the light guide plate 202 thereof. The material of the positioning unit can be selected from materials such as rubber, which is elastic, and is able to undergo elastic deformation. On the other hand, as FIG. 4C shows, at least one through hole 3100 is formed on the supporting plate 310 of the frame body 31 for the fixing portion 61 of the assembling unit 60 passing therethrough to disposing the assembling unit 60 on the frame body 31.

Figure 4C:
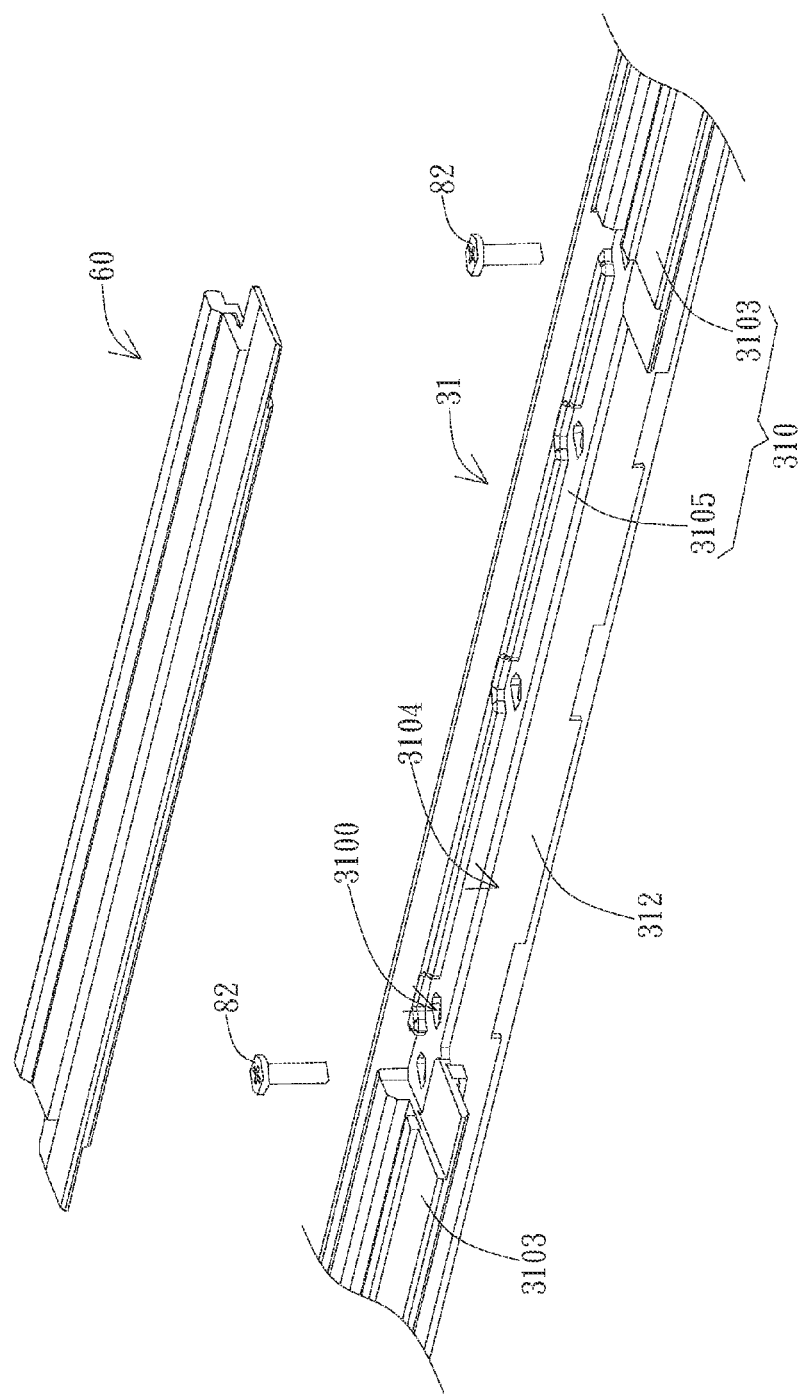
FIG. 4C is a partial schematic view of the frame set of another embodiment of the present invention.
Figure 6A:
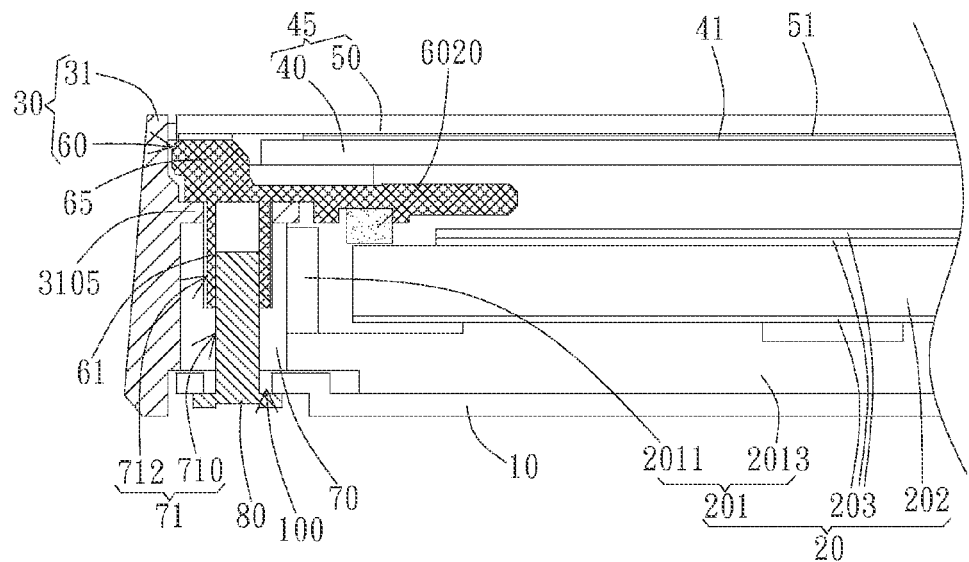
FIG. 6A is a cross-sectional view of the stereoscopic image display device of the present invention along the cross-sectional line crossing the assembling unit and the fixing portion thereof.

Furthermore, as FIGS. 3 and 4C show, the supporting plate 310 includes a plurality of extension portion 3103 spaced at intervals and extending inside the frame body 31. A plurality of notches 3104 are formed between the plurality of extension portions 3103, wherein each of the plurality of assembling units 60 corresponds to each of the plurality of notches 3104 respectively so that each of the assembling unit 60 is accommodated in the corresponding notch 3104. In addition, the frame body 31 includes a connecting portion 3105 protruding from the sidewall 312 into the notch 3104 for the assembling unit 60 to be connected to the frame body 31, wherein the through hole 3100 mentioned above is formed on the connecting portion 3105. In other words, as FIG. 6A shows, the assembling portion 60 can be connected to the connecting portion 3105 of the frame body 31 by the fixing portion 61 passing the through hole 3100 to be disposed therein. As a result, in the embodiment, as FIG. 4C shows, a height of the extension portion 3103 along the sidewall 312 is greater than a height of the connecting portion 3105, wherein the height difference preferably matches up a thickness of the assembling unit 60 on the connecting portion 3105. The assembling unit 60 connected to the frame body 31 therefore together with the extension portion 3103 of the frame body 31 support the liquid crystal panel 40. The assembling unit 60 further includes a protrusion portion 65 protruding toward the liquid crystal panel 40, as shown in FIG. 4A, to be connected to the portion of the transparent plate 50 protruding outside the edge of the liquid crystal panel 40 (shown in FIGS. 6A-6B and 7A; described later).

In the preferred embodiment of the present invention, the assembling unit 60 and the liquid crystal panel 40 can be connected to each other by way of adhering through means such as glue. Since the assembling unit 60 is detachably connected to the frame body 31, liquid crystal panel 40 is therefore disposed on the frame body 31 through the assembling unit 60, wherein the frame body 31 can support the liquid crystal panel 40 directly and/or through the assembling unit 60. Furthermore, since the assembling unit 60 is detachably connected to the back bezel 10, the liquid crystal panel 40 is therefore fastened to the back bezel 10 through the assembling unit 60. In other words, when the connection mechanism between the assembling unit 60 and the back bezel 10 is revoked, the liquid crystal panel 40 can leave the back bezel 10 along with the assembling unit 60. On the other hand, since the assembling unit 60 is detachably connected to the frame body 31 merely by means of the fixing portion 61 thereof passing the through hole 3100 of the connecting portion 3105 of the frame body 31, the assembling unit 60 and the liquid crystal panel 40 disposed thereon can easily leave the frame body 31 as long as the assembling unit 60 is not connected to the back bezel 10 and is movable.

Figure 5:
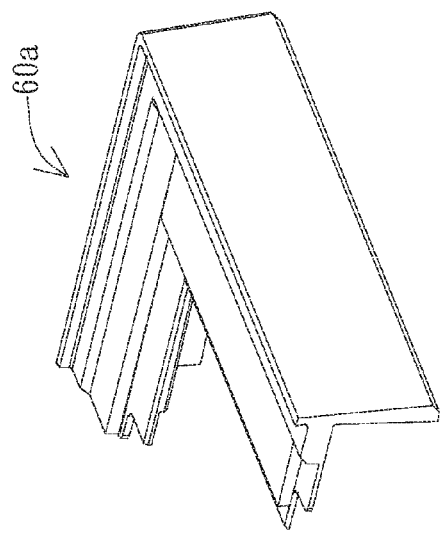
FIG. 5 is a perspective view of another assembling unit of another embodiment of the present invention.
Figure 5:
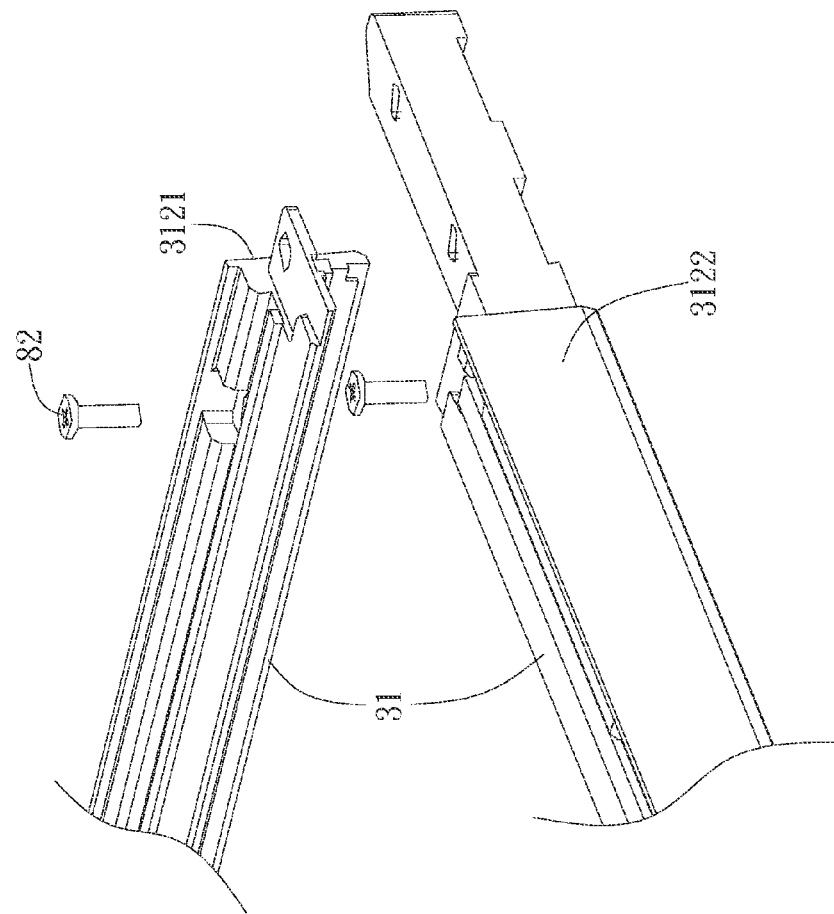

In the other embodiment shown in FIG. 5, an assembling unit 60a further has a function of connecting a plurality of frame body 51. The assembling unit 60a has an L-shaped structure and is located on at least one of the four corners of the frame set 40. On the other hand, the sidewall of the frame body 31 mentioned above further includes a first sidewall 3121 and a second sidewall 3122. The first sidewall 3121 and the second sidewall 3122 are perpendicular to each other and are respectively separably connected to two ends of the L-shaped assembling unit 60a. It is comprehended from the above mention that the L-shaped assembling unit 60a located on at least one of the four corners enables the frame body 31 being connected thereto to have a I-shaped structure. The I-shaped frame body 31 simplifies assembling or dismantling of the frame body 31 and the back bezel 10.

Figure 6B:
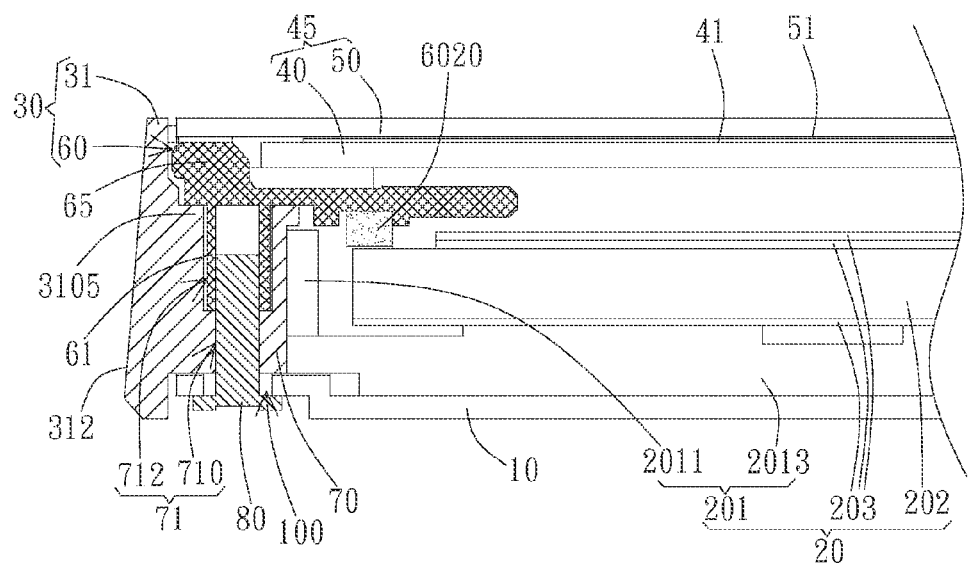
FIG. 6B is another cross-sectional view of the stereoscopic image display device of the present invention along the cross-sectional line crossing the assembling unit and the fixing portion thereof.
Figure 7A:
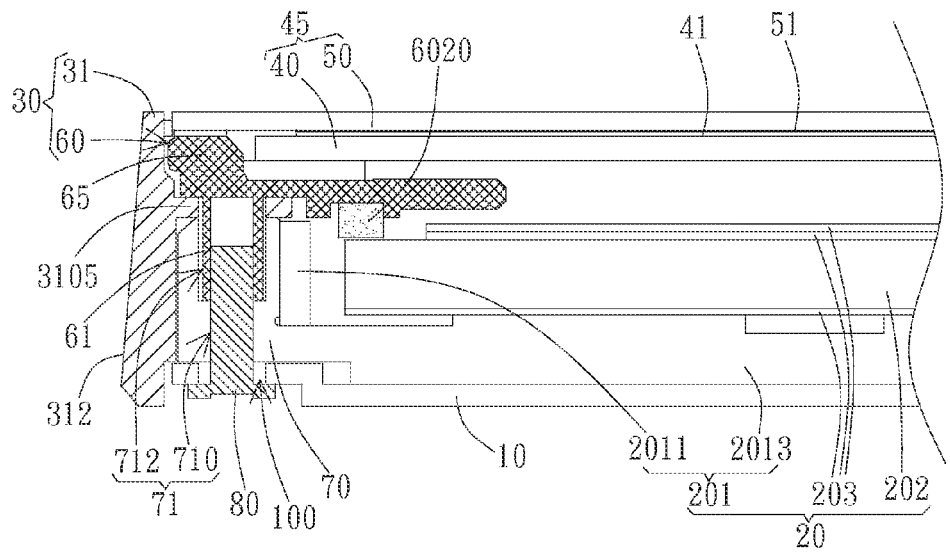
FIG. 7A is another cross-sectional view of the stereoscopic image display device of the present invention along the cross-sectional line crossing the assembling unit and the fixing portion thereof.

In the preferred embodiment of the present invention, as FIGS. 6A-6B and 7 show, the assembling unit 60 is detachably connected to the back bezel 10 by means of a block 70, wherein the block 70 is disposed between the assembling unit 60 and the back bezel 10 as shown in FIG. 6A. Or as shown in FIG. 6B, the block 70 is formed on the frame set 30 and extends from the sidewall 312 toward the backlight module 20. Moreover, the block 70 can be formed at a side of the light source holder 2013 facing the sidewall 312, wherein the light source holder 2013 is adjacent to the sidewall 312 and extends along the sidewall 312. The light source holder can include a heat sink. The block 70 has at least a fastening hole 71 corresponding to the fixing portion 61 of the assembling unit 60 and the fixing hole 100 formed on the back bezel 10. The fastening hole 71 further includes an accommodation portion 712 closer to the liquid crystal panel 40 and a screwing portion 710 closer to the back bezel 101. The fixing portion 61 of the assembling unit 60 is accommodated in the accommodation portion 712, the screwing portion 710 is adjacent to the fixing hole 100, and a fastening element 80 from the outside of the stereoscopic image display device 1 together with the fixing hole 100, the screwing portion 710, and the screwing hole 610 fasten the assembling unit 60 to the back bezel 10. On one hand, disposing the block 70 enhance the fastening of the assembling unit 60 to the back bezel 10, on the other hand, disposing the block 70 enables the portion of the back bezel 10 around the fixing hole 100 not to be elevated toward the fixing portion 61 of the assembling unit 60 to be fastened so that the exterior of the back bezel 10 is smooth and that the outward appearance of the display device is good.

Figure 7B:
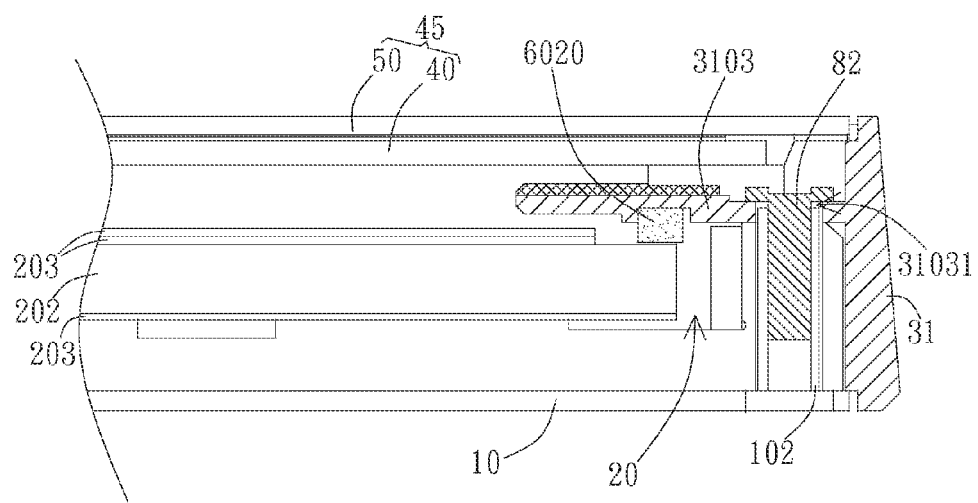
FIG. 7B is another cross-sectional view of the stereoscopic image display device of the present invention along the cross-sectional line crossing the extension portion and the fastening element.

As mentioned above, the assembling unit 60 shown in FIGS. 6A-7A is connected to the liquid crystal panel 40 in way of adhering by means of glue, wherein the protrusion portion 65 is connected to the portion of the transparent plate 50 protruding outside the edge of the liquid crystal panel 40. On the other hand, a positioning unit 6020 is disposed in the accommodation trough 602 formed at the side of the assembling unit 60 facing the backlight module 20 to position the backlight module 20, wherein the assembling unit 60 further together with the frame body 31 position the optical film 203 in way of facing the backlight module 20 to prevent the optical film 203 from departing. In addition, as FIG. 7B shows, a fastening element 82 from a fixing hole 31031 formed on the extension portion 3103 of the frame body 31 together with a screwing protrusion 102 formed on the back bezel 10 fasten the frame body 31 to the back bezel 10; on the other hand, the assembling unit 60 is also connected to the back bezel 10 and is detachably connected to the frame body 31 in way of the fixing portion 61 thereof passing the through hole 3100 of the frame body 31.

Figure 8:
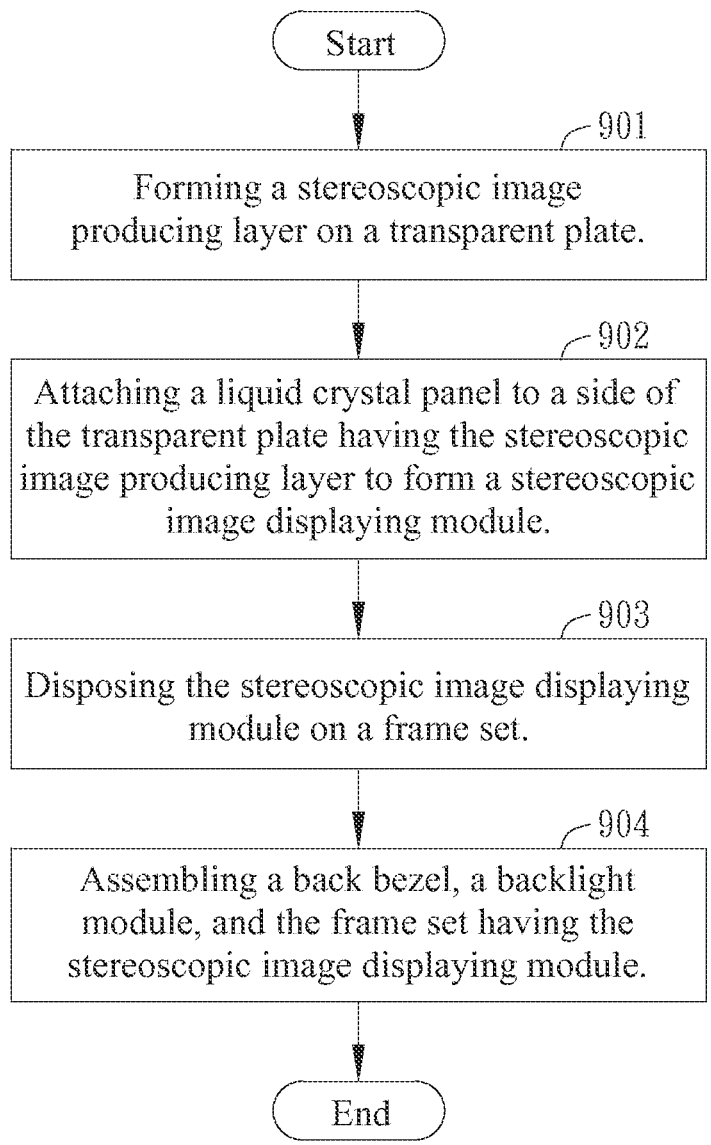
FIG. 8 is a flow chart of the manufacturing method the stereoscopic image display device of the present invention.

The present invention also provides a manufacturing method of the stereoscopic image display device. As FIG. 8 shows, the manufacturing method of the stereoscopic image display device includes step 901: forming a stereoscopic image producing layer on a transparent plate, wherein the transparent plate is preferably a transparent protective plate for protection, forming the stereoscopic image producing layer includes forming a phase retardation layer; in addition, except the stereoscopic image producing layer, it is able to forming a light-shielding layer such as a black matrix along the rim of the transparent plate 50 at one side or two opposite sides of the transparent plate 50 by means of black matrix processing or printing, wherein the light-shielding layer and the stereoscopic image producing layer can at the same side or at the opposites sides of the transparent plate 50. Step 902 includes attaching a liquid crystal panel to a side of the transparent plate having the stereoscopic image producing layer to form a stereoscopic image displaying module. Step 903 includes disposing the stereoscopic image displaying module on a frame set, which further includes supporting the stereoscopic image displaying module by a frame body and/or connecting the stereoscopic image displaying module to an assembling unit; step 904 includes assembling the back bezel, the backlight module, and the frame set having the stereoscopic image displaying module, which further includes connecting the stereoscopic image displaying module connected to the assembling unit or the frame body to the back bezel, wherein the light-shielding layer of the stereoscopic Image producing module is projected on a supporting plate of the frame body while the projection area preferably does not exceed the supporting plate. After the steps 901-904, it is able to dispose a back lid and a decoration plate, which covers and protects electrical circuits at the side of the device at which the decoration plate is disposed so that the assembling of device is accomplished.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A stereoscopic image display device, comprising:
   a back bezel;
   a backlight module disposed on the back bezel;
   a frame body surrounding an outer rim of the backlight module and positioning the backlight module from a side opposite to the back bezel, the frame body including:
   at least a sidewall; and
   a plurality of extension portions spaced at intervals, extending inside the frame body and from an inner surface of the sidewall; wherein a plurality of notches are formed between the plurality of extension portions;
   a connecting portion protruding from the sidewall into one of the notches; wherein a height of the extension portions along the sidewall is greater than a height of the connecting portion;
   a liquid crystal panel disposed at a side of the backlight module facing away from the back bezel to receive light emitted from the backlight module, the liquid crystal panel being surrounded and supported by the frame body; wherein the liquid crystal panel has a display surface facing away from the backlight module;

a transparent plate attached to the display surface of the liquid crystal panel, wherein the transparent plate has a stereoscopic image producing layer at a side facing the display surface; and a plurality of assembling units connected to the liquid crystal panel, corresponding to the plurality of notches and being accommodated in the notches, wherein the assembling units and the extension portions together support the liquid crystal panel.

2. The stereoscopic image display device of claim 1, wherein the frame body includes a supporting plate; the sidewall is disposed on the outer rim of the backlight module, the supporting plate extends from an inner surface of the sidewall toward the liquid crystal panel and comprises the plurality of extension portions.

3. The stereoscopic image display device of claim 2, the plurality of assembling units are detachably connected to the frame body and disposed between the back bezel and the liquid crystal panel; the assembling units are further connected to the liquid crystal panel at one side thereof and detachably connected to the back bezel at a side opposite to the one side thereof.

4. The stereoscopic image display device of claim 3, at least one of the assembling units further comprising a fixing portion extending toward the back bezel to connect the assembling unit and the back bezel.

5. The stereoscopic image display device of claim 4, wherein the fixing portion has a screwing hole corresponding to a fixing hole formed on the back bezel.

6. The stereoscopic image display device of claim 5, wherein at least one through hole is formed on the supporting plate of the frame body, the fixing portion passes through the through hole to be disposed in the through hole.

7. The stereoscopic image display device of claim 6, wherein the through hole is formed on the connecting portion.

8. The stereoscopic image display device of claim 4, further including at least a block disposed between the back bezel and at least one of the assembling units and located between the sidewall and the backlight module, wherein the back bezel is detachably connected to the at least one assembling unit by means of the block.

9. The stereoscopic image display device of claim 8, wherein the block has at least a fastening hole corresponding to the fixing portion and the fixing hole; the fastening hole includes an accommodation portion and a screwing portion, the fixing portion is accommodated in the accommodation portion, the screwing portion is adjacent to the fixing hole.

10. The stereoscopic image display device of claim 9, further including a fastening element, wherein the fastening element together with the fixing hole, the screwing portion, and the screwing hole fasten the at least one assembling unit to the back bezel.

11. The stereoscopic image display device of claim 9, wherein the block is formed on the frame set and extends from the sidewall toward the backlight module.

12. The stereoscopic image display device of claim 9, wherein the backlight module further includes a light source holder adjacent to the sidewall and extending along the sidewall; the block is formed at a side of the light source holder facing the sidewall.

13. The stereoscopic image display device of claim 3, wherein an accommodation trough is formed at a side of at least one of the assembling units facing the backlight module; a positioning unit is disposed in the accommodation trough to position the backlight module.

14. The stereoscopic image display device of claim 3, wherein at least one of the assembling units has a L-shaped structure, the at least one sidewall includes a first sidewall and a second sidewall, the first sidewall and the second sidewall are perpendicular to each other and are respectively separably connected to two ends of the L-shaped structure.

15. The stereoscopic image display device of claim 3, wherein the transparent plate protrudes toward the frame body and outside an edge of the liquid crystal panel; at least one of the assembling units includes a protruding portion connected to a portion of the transparent plate protruding outside the edge of the liquid crystal panel.

16. The stereoscopic image display device of claim 1, wherein the backlight module includes a light source module, a light guide plate, and at least one optical film, the light guide plate and the at least one optical film are disposed on and parallel to the back bezel, the frame body further positions the at least one optical film.

17. The stereoscopic image display device of claim 1, wherein the stereoscopic image producing layer is a phase retardation layer.

18. The stereoscopic image display device of claim 1, wherein the transparent layer further has a light-shielding layer, the light-shielding layer is at a side of the transparent plate facing the display surface and projected on the supporting plate.

19. The stereoscopic image display device of claim 1, wherein the transparent layer further has a light-shielding layer, the light-shielding layer is at a side of the transparent plate facing away from the display surface and projected on the supporting plate.

20. A stereoscopic image display device, comprising:
a back bezel; wherein the back bezel has a fixing hole;
a backlight module disposed on the back bezel;
a frame body surrounding an outer rim of the backlight module and positioning the backlight module from a side opposite to the back bezel, the frame body including:
at least a sidewall; and
a plurality of extension portions spaced at intervals, extending inside the frame body and from an inner surface of the sidewall; wherein a plurality of notches are formed between the plurality of extension portions;
a liquid crystal panel disposed at a side of the backlight module facing away from the back bezel to receive light emitted from the backlight module, the liquid crystal panel being surrounded and supported by the frame body; wherein the liquid crystal panel has a display surface facing away from the backlight module;
a transparent plate attached to the display surface of the liquid crystal panel, wherein the transparent plate has a stereoscopic image producing layer at a side facing the display surface;
a plurality of assembling units connected to the liquid crystal panel, corresponding to the plurality of notches and being accommodated in the notches;
wherein at least one of the assembling units comprises a fixing portion extending toward the back bezel; and
a block disposed between the back bezel and the at least one of the assembling units; wherein the block has at least a fastening hole corresponding to the fixing portion and adjacent to the fixing hole; wherein the fixing portion is accommodated in the fastening hole.

21. The stereoscopic image display device of claim 20, wherein the fixing portion is to connect the assembling unit and the back bezel.

22. The stereoscopic image display device of claim 21, wherein the fixing portion has a screwing hole corresponding to the fixing hole formed on the back bezel.

23. The stereoscopic image display device of claim 21, wherein the block is further located between the sidewall and the backlight module, wherein the back bezel is detachably connected to the assembling unit by means of the block.

24. The stereoscopic image display device of claim 23, wherein the fastening hole includes an accommodation portion and a screwing portion, the fixing portion is accommodated in the accommodation portion, the screwing portion is adjacent to the fixing hole.

* * * * *